G. P. SISSON.
EGG-BEATER.

No. 186,278.

Patented Jan. 16, 1877.

WITNESSES
Nat. E. Oliphant
Geo. R. Porter.

INVENTOR
George P. Sisson,
per Chas. H. Fowler,
Attorney.

UNITED STATES PATENT OFFICE.

GEORGE P. SISSON, OF NORTHAMPTON, MASSACHUSETTS, ASSIGNOR OF ONE-HALF HIS RIGHT TO OSMORE O. ROBERTS, OF SAME PLACE.

IMPROVEMENT IN EGG-BEATERS.

Specification forming part of Letters Patent No. 186,278, dated January 16, 1877; application filed December 11, 1876.

*To all whom it may concern:*

Be it known that I, GEORGE P. SISSON, of Northampton, in the county of Hampshire and State of Massachusetts, have invented a new and valuable Improvement in Egg-Beaters; and I do hereby declare that the following is a full, clear, and exact description of the construction and operation of the same, reference being had to the annexed drawings, making a part of this specification, and to the letters and figures of reference marked thereon.

Figure 1:
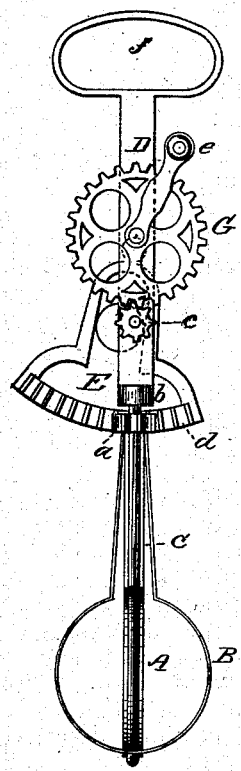
Figure 2:
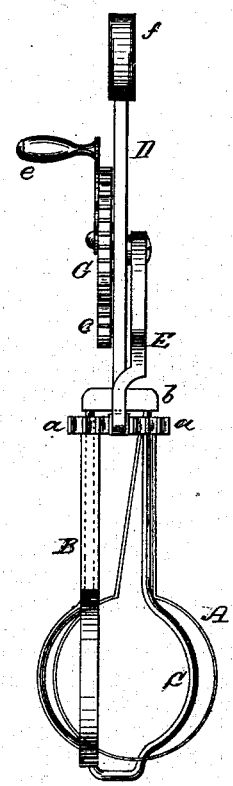
Figure 3:
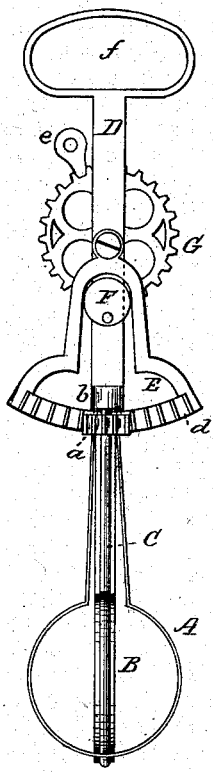

Figure 1 of the drawings is a representation of my invention, showing the operating mechanism. Fig. 2 is an end view. Fig. 3 is a side view of the same.

This invention has relation to egg-beaters; and consists in imparting to the floats or beaters a reciprocating rotary motion by the employment of a mechanism consisting of a pivoted frame connected to the floats or beaters by suitable gearing, said frame being vibrated by an eccentric working within a slotted frame, as will be hereinafter described, and subsequently pointed out in the claims.

In the accompanying drawings, A B represent two floats or beaters hung upon a frame, C, in such a manner that both may have a reciprocating rotary motion—one partially within the other—the movement of each being in opposite directions; but, if desired, however, they may be hung upon the same center, and have their motion one directly within the other, without departing from the principle of my invention.

To the upper ends of the frame, and to the ends of the beaters, are rigidly secured pinions $a$, which have their bearings in a cross-piece, $b$, of a shaft, D, each of which pinions mesh with teeth $d$ formed upon the sides of a vibratory frame, E, pivoted to the shaft D. Within the frame E works an eccentric, F, which also has its bearings in the shaft, and carries a pinion, $c$, the same meshing with the teeth upon a large driving-gear wheel, G, said wheel being operated by a suitable crank-handle, $e$.

A handle, $f$, is formed upon the upper end of the shaft to facilitate the beater, being held stationary while operated within the receptacle containing the fluid.

From the above description it may be seen that by the simple rotation of the driving-wheel G a similar motion is given to the eccentric F, which, in turn, vibrates the frame E, and imparts a reciprocating rotary motion to the floats or beaters A B. Thus the fluid being acted upon is cut and thoroughly beaten almost instantaneously, as it cannot partake of the motion of the floats.

Having now fully described my invention, what I claim as new, and desire to secure by Letters Patent, is—

1. An egg-beater, the beaters or floats of which are hung substantially as described, and having imparted to them a reciprocating motion in opposite directions by a slotted frame suitably connected to said beaters or floats, and vibrated by the rotation of an eccentric, substantially as set forth.

2. The combination, with the floats or beaters A B, hung upon the frame C, and carrying pinions $a$, of the vibrating frame E, with teeth $d$, eccentric F, pinion $c$, and driving-wheel G, substantially as and for the purpose set forth.

In testimony that I claim the above I have hereunto subscribed my name in the presence of two witnesses.

GEORGE P. SISSON.

Witnesses:
OLIVER WALKER,
A. L. THAYER.